Sept. 20, 1938.  E. E. HEWITT  2,130,620
FLUID PRESSURE BRAKE
Filed June 2, 1937   2 Sheets-Sheet 2

INVENTOR
ELLIS E. HEWITT
BY Wm. N. Cady
ATTORNEY

Patented Sept. 20, 1938

2,130,620

UNITED STATES PATENT OFFICE 2,130,620

FLUID PRESSURE BRAKE

Ellis E. Hewitt, Edgewood, Pa., assignor to The Westinghouse Air Brake Company, Wilmerding, Pa., a corporation of Pennsylvania Application June 2, 1937, Serial No. 145,977

19 Claims. (Cl. 303—40)

This invention relates to a fluid pressure brake equipment and more particularly to a locomotive brake equipment of the type shown in my U. S. Patent No. 2,009,841, issued July 30, 1935, and in U. S. Patent No. 2,045,159, issued June 23, 1936, to Charles H. McKinstry.

The brake equipments shown in the above identified patents employ a distributing valve having an application portion operative on an increase in fluid pressure to effect an application of the brakes. This distributing valve also has an equalizing portion subject to the opposing pressures of the fluid in the brake pipe and of the fluid in a pressure chamber, and operative on a reduction in brake pipe pressure to supply fluid under pressure from the pressure chamber to the application portion.

In the brake equipment shown in certain of the above identified patents, a delay valve is shown which is operative in one position to restrict the rate of flow of fluid to the application portion on an emergency application of the brakes to thereby restrict the rate of build up of brake cylinder pressure on the locomotive. This feature is valuable where the locomotive is employed to haul long trains, and prevents too rapid build up of brake cylinder pressure on the locomotive, which might result in too rapid run-in of the slack in the train.

If, however, the locomotive is not being employed to haul a train, but is running light, and the delay valve is conditioned to restrict the rate of supply of fluid to the application portion of the distributing valve, the application of the brakes on the locomotive may be retarded too much, and prevent the engineer from stopping the locomotive as soon as necessary.

The engineer's brake valve in the brake equipments shown in the above identified patents has an automatic portion, by means of which the brakes on the train hauled by the locomotive, as well as the brakes on the locomotive, may be controlled. The engineer's brake valve also includes an independent portion which controls only the brakes on the locomotive.

The independent portion of the engineer's brake valve operates in its application position to supply fluid under pressure to the application portion of the distributing valve through a communication controlled by the delay valve, and if the delay valve is in the delay position, in which it restricts the flow of fluid through the communication controlled thereby, the supply of fluid to the application portion of the distributing valve by the independent portion of the engineer's brake valve will be retarded, and the application of the brakes on the locomotive by operation of the independent portion of the engineer's brake valve will accordingly take place at a slow rate.

The independent portion of the engineer's brake valve, in certain brake equipments of this type, is provided with a slow application position, in which fluid under pressure is supplied at a slow rate to the communication leading to the application portion of the distributing valve. The independent portion of the engineer's brake valve also has a fast application position, in which fluid under pressure is supplied to this communication at a rapid rate. If, however, the delay valve is in the delay position, it will not permit a rapid flow of fluid through this communication to the application portion, even though fluid is supplied to this communication at a rapid rate.

It is an object of this invention to provide an improved locomotive brake equipment of the type described, and incorporating means to effect a rapid application of the brakes on the locomotive by operation of the independent portion of the engineer's brake valve, even though the delay valve has been conditioned to restrict the rate of application of the brakes on the locomotive.

A further object of the invention is to provide in a locomotive brake equipment of the type described which incorporates a delay valve subject to the pressure of the fluid in a chamber, and a control valve device for controlling the supply and release of fluid under pressure to and from said chamber, means controlled by the independent portion of the engineer's brake valve for also controlling the pressure of the fluid in this chamber.

Another object of the invention is to provide an improved locomotive brake equipment.

Other objects of the invention and features of novelty will be apparent from the following description taken in connection with the accompanying drawings, in which.

Figure 1:
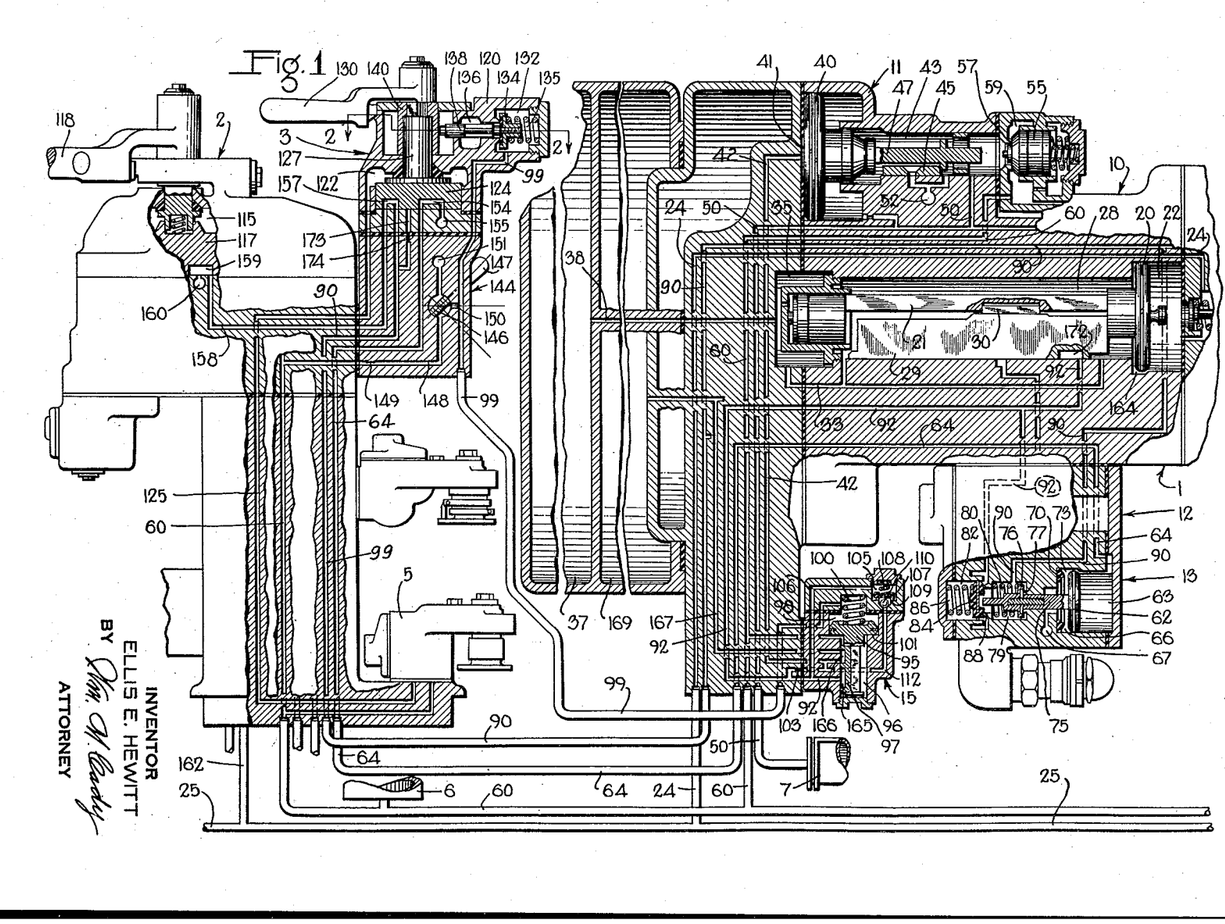
Fig. 1 is a diagrammatic view, largely in section, of a locomotive brake equipment embodying my invention.

As shown in the drawings, the brake equipment comprises a distributing valve 1, an engineer's brake valve comprising an automatic portion 2 and an independent portion 3, a reducing valve device 5, a main reservoir 6, and a brake cylinder 7.

The distributing valve 1 comprises an equalizing portion 10, an application portion 11, a reduction chamber cut-off valve device 12, a release valve device 13, and a delay valve 15.

The distributing valve 1, and the other portions of the apparatus employed in the system shown in this application, with the exceptions which are hereinafter particularly pointed out, are substantially the same in construction and operation as the corresponding apparatus employed in the aforementioned patents, and only such portions of the apparatus are disclosed and described in this application, and only the portions of the operation of the equipment are described, which are essential to the understanding of the improvement provided by this invention.

The equalizing portion 10 of the distributing valve 1 comprises a piston 20 having at one side thereof a piston chamber 22, which is connected by way of a passage and pipe 24 with the brake pipe 25, while the piston 20 has at the other side a valve chamber 28 containing a main slide valve 29, and an auxiliary slide valve 30 having movement relative to the main slide valve 29. The main slide valve 29 and the auxiliary slide valve 30 are operated by the piston 20 through the medium of a stem 21 associated with the piston.

The valve chamber 28 is connected by way of a passage 33 with a chamber 35, which is in constant communication with a pressure chamber 37 by way of a passage 38.

The application portion 11 of the distributing valve 1 comprises a piston 40 having at one side thereof a chamber 41 which is connected by way of a passage 42 with the delay valve device 15, and having at the other side thereof an application valve chamber 43 in which is mounted a brake cylinder exhaust slide valve 45 operated by means of a stem 47 formed integral with the piston 40. The valve chamber 43 is in constant communication with the brake cylinder 7 by way of a passage and pipe 50, while the slide valve 45 controls communication between the valve chamber 43 and an exhaust passage 52.

The application piston 40 is adapted to control the operation of a supply valve device 55, which is yieldingly held in engagement with a seat rib 57 surrounding a passage open to the valve chamber 43. The supply valve device 55 is mounted in a chamber 59 which is constantly connected by way of a passage and pipe 60 with the main reservoir 6.

The release valve device 13 is provided for the purpose of controlling the release of the locomotive brakes independently of the operation of the equalizing portion 10 of the distributing valve device 1, and, as shown, comprises a piston 62 mounted in a bore in a body associated with the distributing valve 1. The piston 62 has at one side thereof a chamber 63, which is connected by way of an independent release passage and pipe 64 with a port in the seat of the rotary valve of the independent portion 3 of the engineer's brake valve.

The piston 62 has at the other side thereof a chamber 66 which is connected to the atmosphere by way of a passage 67, while an annular gasket 70 is secured against the end wall of the bore in which the piston 62 is mounted, and is provided with a sealing rib which is adapted to be engaged by a face of the piston 62 to cut off communication from the chamber 63 to the atmosphere by way of the passage 67. A feed groove 73 is formed in the wall of the bore in which the piston 62 is mounted, and in one position of the piston extends around the piston so as to establish communication between the chamber 63 and the chamber 66, and therefrom to the atmosphere by way of the passage 67.

The piston 62 has a stem 75 formed integral therewith and slidably mounted in a bore in the body of the valve portion, and this stem has secured thereon a valve 76 carrying a sealing gasket adapted to engage a seat rib 77 surrounding the bore in which the stem 75 is mounted. The valve 76 is mounted in a chamber 79, while a coil spring 80 is mounted in this chamber and yieldingly maintains the valve 76 in engagement with the seat rib 77.

The body of the release valve device 13 includes, in addition, a valve chamber 82 in which is mounted a valve 84, while a spring 86 is mounted in this chamber and yieldingly presses the valve 84 into engagement with a seat rib 88 surrounding a passage open to the chamber 79.

The chamber 79 is constantly connected by way of the independent application passage and pipe 90 with a port in the seat of the rotary valve of the independent portion 3 of the engineer's brake valve. The chamber 82 is constantly connected by way of a passage 92 with a port in the seat of the main slide valve 29 of the equalizing portion 10, and also with a port in the seat of the slide valve of the delay valve 15.

The delay valve 15 comprises a body having a bore therein in which is mounted a piston 95 having at one side thereof a valve chamber 96 in which is mounted a slide valve 97 operated by a stem formed integral with the piston 95. The valve chamber 96 is constantly connected with the main reservoir 6 by way of a branch of the passage 60.

The piston 95 has at the other side thereof a chamber 98, which is constantly connected by way of a passage and pipe 99 to a passage in the independent portion 3 of the engineer's brake valve, while a coil spring 100 is mounted in the chamber 98 and yieldingly urges the piston 95 to the position in which it is shown in the drawings, in which the piston engages a shoulder 101 formed on the body of the delay valve 15.

The delay valve 15 has associated therewith a passage having a choke 103 interposed therein, and connecting the passage 92, leading from the equalizing portion 10 and the release valve device 13, and the passage 42, leading to the chamber 41 at the face of the piston 40 of the application portion 11.

The delay valve 15 also has associated therewith a valve chamber 105 which is constantly connected by way of a passage 106 with the passage 92, while a check valve 107 is mounted in this chamber and is yieldingly pressed by a spring 108 into engagement with a seat rib 109 surrounding a chamber in which is mounted a ball check valve 110, which engages a seat surrounding the end of a passage 112 leading from the passage 42, which is connected to the chamber 41 of the application portion 11.

The automatic portion 2 of the engineer's brake valve is of the usual construction and comprises a casing having a chamber 115 therein in which is mounted a rotary valve 117 which is operated by means of a handle 118.

The independent portion 3 of the engineer's brake valve comprises a casing section 120 having a chamber 122 therein in which is mounted a rotary valve 124. The chamber 122 is constantly supplied with fluid under pressure through a passage 125 by means of the reducing valve device 5.

The rotary valve 124 has associated therewith a shaft 127, to the upper end of which is secured a handle 130 for operating the rotary valve 124.

The casing section 120 has a valve chamber 132 formed therein and constantly connected by way of the passage and pipe 99 with the chamber 98 at the spring side of the piston 95 of the delay valve 15. A valve 134 is mounted in the chamber 132 and is yieldingly held by a coil spring 135 in engagement with a seat rib surrounding a passage leading to a chamber 136 which is open to the atmosphere, as is clearly shown in Fig. 2 of the drawings.

Figure 2:
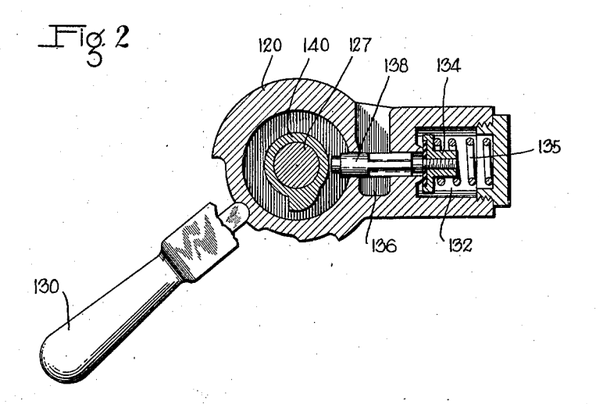
Fig. 2 is an enlarged sectional view taken substantially along the line 2—2 on Fig. 1.

The valve 134 is provided with a fluted stem 138 which extends through the chamber 136 and is engaged at certain times, as will hereinafter more fully appear, by a cam element 140 secured on the shaft 127 for moving the valve 134 away from its seat against the spring 135.

The independent portion 3 of the engineer's brake valve has associated therewith a control valve device indicated generally by the reference numeral 144 for controlling the supply of fluid under pressure to the chamber 98 at the spring side of the piston 95 of the delay valve 15, and for also controlling the release of fluid under pressure from this chamber. The control valve device 144 comprises a valve element 146 mounted in a bore in the body of the independent portion 3 and operated by means of a handle 147.

The bore in which the valve element 146 is mounted has a port therein which is connected by way of a passage 148 with a branch of the passage 60 leading from the main reservoir 6, while the passage 148 has a choke 149 interposed therein to limit the supply of fluid under pressure from the main reservoir to the passage 148. The bore in which the valve element 146 is mounted also has a port 150 therein open to the passage 99, to which is connected the pipe leading to the chamber 98 at the spring side of the piston 95 of the delay valve 15, while the bore in which the valve 146 is mounted has another port therein which is connected to an atmospheric passage 151.

When the valve element 146 is in the position in which it is shown in Fig. 1 of the drawings, which is its delay position, it establishes communication between the port to which is connected the passage 148, and the port 150 leading to the passage 99, with the result that fluid under pressure is supplied from the main reservoir 6 to the chamber 98 of the delay valve device 15. In this position of the valve element 146, communication is cut off between the port 150 and the port to which is connected the atmospheric passage 151.

When the valve element 146 is turned substantially ninety degrees, or one-quarter of a revolution, from the delay position in which it is shown in Fig. 1 of the drawings, to the non-delay position in which the handle occupies a position indicated by the lower broken line in Fig. 1 of the drawings, the valve element 146 will cut off communication from the passage 148 and the atmospheric passage 151, and also between the passage 148 and the port 150 leading to the pipe 99, while the valve element 146 will establish communication between the port 150 and the atmospheric passage 151, to thereby release fluid under pressure from the chamber 98 of the delay valve 15.

This is the non-delay position of the handle 147, and conditions the locomotive brake equipment for operation when the locomotive is employed to handle short freight trains or is employed in passenger service.

The valve element 146 has an intermediate position which it occupies when the handle 147 is turned to the position indicated in Fig. 1 by the substantially horizontal broken line. When the valve element 146 is in this position, it cuts off communication between the port 150 and the passage 148, and also between the port 150 and the atmospheric passage 151. The valve 146, therefore, neither permits fluid under pressure to be supplied to the delay valve 15 nor does it permit fluid under pressure to be released therefrom. This position of the valve element 146 is useful when the locomotive is provided with control equipment at each end, and conditions the delay valve 15 to be controlled by means of the control equipment at the opposite end of the locomotive.

*Initial charging*

Figure 3:
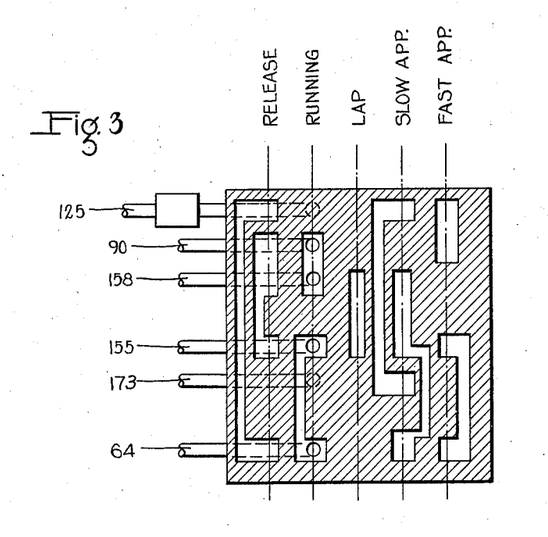
Fig. 3 is a diagram of the ports in the rotary valve of the independent portion of the engineer's brake valve.

In charging the equipment, the handle 130 of the independent brake valve 3 is turned to the running position in which position a port 154 in the rotary valve 124 connects the independent release pipe 64 to an atmospheric passage 155, and in which a port 157 in the rotary valve 124 connects the independent application pipe and passage 90 with a passage 158 leading to a port in the seat of the rotary valve 117 of the automatic portion 2 of the engineer's brake valve.

Also in initially charging the equipment, the handle 118 of the automatic portion 2 of the engineer's brake valve is turned first to the release position, and, after a period of time has elapsed, it is then turned to the running position in which a port 159 in the rotary valve 117 establishes connection between the passage 158 and an atmospheric passage 160.

When the rotary valve 117 of the automatic portion 2 of the engineer's brake valve device is in the release position, fluid at main reservoir pressure flows by way of a pipe 162 to the brake pipe 25, and thence by way of the branch pipe and passage 24 to the chamber 22 at the face of the piston 20 of the equalizing portion 10 of the distributing valve device 1.

On an increase in the pressure of the fluid in the chamber 22, the piston 20 is moved to the release position in which communication is opened through a feed groove 164 so that fluid under pressure flows around the piston 20 to the valve chamber 28, and therefrom by way of the passage 33 to the chamber 35, and thence by way of the passage 38 to the pressure chamber 37 to charge these chambers with fluid under pressure.

After a brief time interval the rotary valve 117 of the automatic portion 2 of the engineer's brake valve is turned from the release position to the running position, in which fluid is supplied to the brake pipe at the pressure supplied by a feed valve device associated with the engineers' brake valve, and which operates to supply fluid under pressure at the pressure normally maintained in the brake pipe.

Fluid under pressure from the main reservoir 6 flows by way of the pipe and passage 60 to the chamber 96 of the delay valve device 15, and charges this chamber to the pressure maintained in the main reservoir 6.

At this time, assuming that the handle 147 of the control valve device 144 is in the delay position, which is the position in which it is shown in Fig. 1 of the drawings, so that the valve element 146 cuts off communication between the port 150 and the atmospheric port 151, and permits communication between the passage 148 and the port 150, fluid under pressure supplied from the main reservoir 6 will flow through the choke 149 to the passage 148, and thence through the port 150 to the passage and pipe 99, leading to the chamber 98 at the spring side of the piston 95 of the delay valve 15, and charges this chamber with fluid at the pressure maintained in the main reservoir 6. As the chambers at the opposite sides of the piston 95 are charged with fluid under pressure at main reservoir pressure, the piston 95 will be held by the spring 100 in engagement with the shoulder 101.

In this position of the piston 95, the slide valve 97 is held in a position in which a cavity 165 therein does not establish communication between the passage 92 and the passage 42, and in which a cavity 166 therein establishes communication between the passage 42 and a passage 167 leading to an application chamber 169. This is the delay position of the piston and slide valve of the delay valve 15.

*Operation on an automatic emergency application of the brakes*

If at this time it is desired to effect an automatic emergency application of the brakes, the handle 118 of the automatic portion 2 of the engineer's brake valve is turned to the emergency position. The rotary valve 117 will operate in this position to cut off the supply of fluid under pressure by the feed valve device to the brake pipe 25, while fluid under pressure will be vented from the brake pipe at an emergency rate, as explained in detail in the patents referred to above.

On this sudden emergency reduction in brake pipe pressure, there is a rapid reduction in the pressure of the fluid in the chamber 22 at the face of the piston 20 of the equalizing portion 10 of the distributing valve 1, and the piston 20 is moved to the emergency position and moves the main slide valve 29 to a position in which a cavity 172 therein establishes communication between the passage 33 and the passage 92 so that fluid under pressure flows from the pressure chamber 37 to the passage 92.

As the slide valve 97 of the delay valve 15 is in the delay position at this time, fluid under pressure supplied to the passage 92 cannot flow through the cavity 165 to the passage 42 leading to the application portion 11. However, fluid under pressure flows from the passage 92 at a restricted rate through the choke 103, and thence to the passage 112, a branch of which is connected to the passage 42, leading to the chamber 41 of the application portion 11, while in this position of the slide valve 97, the cavity 166 connects the passage 42 with the passage 167 leading to the application chamber 169. As a result, therefore, there will be a slow increase in the pressure of the fluid supplied by way of the passage 42 to the chamber 41 at the face of the piston 40 of the application portion 11, and also in the application chamber 169.

On an increase in the pressure of the fluid in the chamber 41, the piston 40 is moved to the right, as viewed in Fig. 1 of the drawings, and moves the slide valve 45 to a position to cut off communication between the valve chamber 43 and the atmospheric passage 52, while upon further movement of the piston 40, the end of the stem 47 thereof operates the supply valve device 55 to open communication from the chamber 59 past the seat rib 57, so that fluid under pressure is supplied from the main reservoir 6 to the valve chamber 43, and thence by way of the passage and pipe 50 to the brake cylinder 7, to increase the pressure of the fluid in the brake cylinder and in the valve chamber 43 substantially as rapidly as the pressure of the fluid in the chamber 41 at the opposite face of the piston 40 is increased by the supply of fluid under pressure thereto through the choke 103.

Since the choke 103 has a limited flow capacity, the increase in the pressure of the fluid in the chamber 41 and in the application chamber 169 will take place slowly, and the application of the brakes on the locomotive will be effected slowly.

It will be seen, therefore, that on the movement of the handle 118 of the automatic portion 2 of the engineer's brake valve to the emergency position, at a time when the delay valve 15 is conditioned to restrict the rate of supply of fluid under pressure to the application portion 11 of the distributing valve 1, the application of the brakes on the locomotive will be effected at a slow rate.

On the reduction in brake pipe pressure at an emergency rate, the brake equipment on the cars of a train hauled by the locomotive is operated to produce an emergency application of the brakes on the cars throughout the train to thereby retard the cars. As the application of the brakes on the locomotive is delayed by operation of the delay valve 15, the locomotive will exert force on the cars to stretch out the slack in the train, and thereby prevent too rapid run-in of the slack in the train.

On a subsequent increase in the pressure of the fluid in the brake pipe, the brake equipment on the cars of the train hauled by the locomotive are operated to release the brakes on the cars, while fluid under pressure from the brake pipe 25, flows by way of the branch pipe and passage 24 to the chamber 22 at the face of the piston 20, and on an increase in the pressure of the fluid in the chamber 22, the piston 20 is moved to the release position in which the supply of fluid under pressure from the pressure chamber 37 to the chamber 41 of the application portion 11 is cut off, and in which fluid under pressure is released from the application portion 11. Fluid under pressure may be released from the chamber 41 of the application portion 11 at a rapid rate through the passage 112 and past the check valves 107 and 110 of the delay valve 15, and thence by way of the passage 106, so that the release of the brakes on the locomotive may be effected at a rapid rate.

*Operation on brake application by the independent brake valve in its fast application position*

If, however, the locomotive is not employed to haul a train, but is running light, there is no reason to retard the application of the brakes on the locomotive to modify the slack action in the train, and the delay in the application of the brakes on the locomotive may make it impossible to stop the locomotive as quickly as is desired. The brake equipment provided by this invention incorporates means to permit a rapid application of the brakes on the locomotive to be effected, if desired, even though the delay valve is conditioned to retard the application of the brakes. The independent portion of the engineer's brake valve is provided with a slow application position and a fast application position, and in the brake equipment provided by this invention means is provided which is operable upon movement of the handle 130 of the independent portion 3 of the engineer's brake valve to the fast application position to effect movement of the piston of the delay valve 15 to the non-delay position, if it is not already in this position.

When the handle 130 of the independent portion 3 of the engineer's brake valve is turned, the shaft 127 is turned, thereby turning the rotary valve 124 upon its seat, while the cam element 140 secured on the shaft 127 is also turned.

As is best shown in Fig. 2 of the drawings, the cam element 140 has a cam surface formed thereon which is arranged so that upon movement of the shaft 127 and the handle 130 to the fast application position, it engages the end of the stem 138 associated with the valve 134, and moves the valve 134 against the spring 135 away from the seat rib surrounding the passage in which the fluted stem 138 is mounted.

On movement of the valve 134 away from its seat, a relatively large communication is opened between the atmosphere and the chamber 132, to which is connected a branch of the passage 99 leading from the chamber 98 at the spring side of the piston 95 of the delay valve 15. When this communication is opened between the chamber 132 and the atmosphere, fluid under pressure is released from the passage 99 at a more rapid rate than fluid under pressure can be supplied thereto through the choke 149 and passage 148 when the valve 146 of the control valve device 144 is in the position in which it is illustrated in Fig. 1 of the drawings. As a result there will be a decrease in the pressure of the fluid in the chamber 98 at the face of the piston 95, and the piston 95 will be moved upwardly to the non-delay position by the higher pressure of the fluid in the chamber 96, thereby moving the slide valve 97 to a position in which the cavity 165 therein establishes a communication between the passage 92 and the passage 42 which by-passes the choke 103, and in which the cavity 166 no longer establishes communication between the passage 42 and the passage 167 leading from the application chamber 169.

When the rotary valve 124 is turned to the fast application position, a port in the seat of the rotary valve establishes communication between the independent release pipe 64 and the atmospheric passage 155, while communication is no longer established between the independent application pipe 90 and the passage 158 leading to the port in the seat of the rotary valve 117 of the automatic portion 2 of the engineer's brake valve.

In addition, when the rotary valve 124 of the independent portion 3 of the engineer's brake valve is turned to the fast application position, a port is opened through which fluid under pressure supplied by the feed valve device 5 to the chamber 122 of the independent portion of the engineer's brake valve may flow at a rapid rate to the independent application passage and pipe 90, and on the supply of fluid under pressure to this pipe, fluid flows to the chamber 79 of the release valve device 13. On an increase in the pressure of the fluid in the chamber 79, the valve 76 is moved against the spring 80 so that fluid flows to the chamber 82, and thence by way of the passage 92 to the delay valve 15. As pointed out above, at this time the piston and slide valve of the delay valve 15 are in the non-delay position in which the cavity 165 establishes communication between the passage 92 and the passage 42, and, as a result, fluid under pressure supplied to the passage 92 may flow at a rapid rate through a cavity 165 to the passage 42, and thence to the chamber 41 at the face of the piston 40 of the application portion 11 to increase the pressure of the fluid in this chamber at a rapid rate. On an increase in the pressure of the fluid in the chamber 41, the piston 40 is moved to the right, as viewed in Fig. 1 of the drawings, while the application portion 11 operates, as described in detail above, to supply fluid under pressure to the brake cylinder 7 to increase the pressure of the fluid therein, and in the valve chamber 43, substantially as rapidly as the pressure of the fluid in the chamber 41 at the opposite face of the piston 40 is increased.

As the application portion 11 supplies fluid under pressure to the brake cylinder 7 at a rapid rate, the application of the brakes on the locomotive will be effective very quickly to enable the locomotive to be stopped quickly when desired.

It will be seen that upon movement of the handle 130 of the independent portion 3 of the engineer's brake valve to the fast application position, the delay valve 15 is conditioned to permit a rapid supply of fluid under pressure to the application portion 11 even though the control valve device 144, which controls the delay valve 15, is in the position to normally cause the piston of the delay valve 15 to occupy the delay position. As a result, therefore, on movement of the handle 130 of the independent portion 3 of the engineer's brake valve to the fast application position, fluid under pressure will be supplied to the application portion 11 at a rapid rate, and a fast application of the brakes on the locomotive will be produced, thereby permitting the locomotive to be stopped very quickly if desired.

On a subsequent movement of the handle 130 of the engineer's brake valve to the release position, the cam element 140 is turned so that it no longer engages the end of the stem 138 associated with the valve 134, and the valve 134 is moved to the seated position by the spring 135 to cut off the release of fluid under pressure from the chamber 132. On movement of the valve 134 to the seated position, and on the continued supply of fluid under pressure from the main reservoir 6 through the choke 149 and the passage 148 to the pipe 99, assuming that the handle 147 of the control valve device 144 remains in the position in which it is shown in Fig. 1 of the drawings, fluid under pressure will flow to the chamber 98 of the delay valve 15, and will increase the pressure of the fluid in this chamber to main reservoir pressure. On this increase in the pressure of the fluid in the chamber 98, the piston 95 is moved into engagement with the shoulder 101 by the spring 100, and moves the slide valve 97 to the delay position in which the cavity 165 no longer establishes communication between the passages 92 and 42, and in which the cavity 166 establishes communication between the passages 42 and 167.

In addition, on this movement of the handle 130, the rotary valve 124 is turned to a position in which the supply of fluid under pressure to the independent application passage and pipe 90 is cut off, while the independent application passage and pipe 90 is connected to the atmospheric passage 155. In this position of the rotary valve 124, a port in the rotary valve establishes communication between the chamber 122 and the independent release pipe and passage 64 so that fluid under pressure supplied by the reducing valve device 5 to the chamber 122 flows to the independent release pipe 64, and through this pipe to the chamber 63 in the release valve device 13.

On an increase in the pressure of the fluid in the chamber 63, the piston 62 is moved to the left, as viewed in Fig. 1 of the drawings, so that a face thereof engages the sealing gasket 70 to prevent the flow of fluid through the groove 73 to the atmospheric passage 67, while force is exerted through the piston stem 75 to move the valve 84 against the spring 86 away from the seat rib 88.

On movement of the valve 84 away from its seat, fluid under pressure may flow from the chamber 82 to the chamber 79, and thence by way of the independent application pipe and passage 90 to the atmosphere through the port in the rotary valve 124 of the independent portion 3 of the engineer's brake valve.

On the release of fluid under pressure from the chamber 82, fluid is supplied thereto from the chamber 41 of the application portion 11 through the passage 42 and the passage 112, past the ball check valve 110, the check valve 107 to the chamber 105, and thence by way of the passage 106 and the passage 92 to the chamber 82. On this reduction in the pressure of the fluid in the chamber 41, the application portion 11 will operate in the usual manner to release fluid under pressure from the brake cylinder 7 and thereby release the brakes on the locomotive.

On a subsequent movement of the handle 130 of the independent portion of the engineer's brake valve to the running position, the rotary valve 124 is turned to a position in which fluid under pressure is no longer supplied from the chamber 122 to the independent release pipe 64, while the independent release pipe 64 is connected to the atmospheric passage 155 to release the fluid under pressure therein. On this release of fluid from the independent release pipe 64, there is a reduction in the pressure of the fluid in the chamber 63 of the release valve device 13, and the piston 62 is moved away from the sealing gasket 70 by the spring 80 operating through the piston stem 75, assisted by the spring 86, while the valve 76 is moved into engagement with the seat rib 77 surrounding the passage in which the stem 75 is mounted. On movement of the piston 62 away from the sealing gasket 70, communication is opened from the chamber 63 through the groove 73, so that the fluid under pressure remaining in the chamber 63 may escape to the atmosphere by way of the passage 67.

In addition, upon this movement of the piston 62, the end of the stem 75 is moved away from the valve 84, while the valve 84 is moved to the seated position by the spring 86 to cut off the flow of fluid from the passage 92 and the chamber 82 to the chamber 79, and thence to the atmosphere by way of the independent application pipe 90.

On movement of the valve 84 to the seated position, any fluid under pressure remaining in the chamber 41 of the application portion 11 may flow from the passage 92 to the independent application pipe and passage 90 by way of a communication established in the reduction chamber cut off valve device 12, as explained in detail in the above identified patents.

On movement of the rotary valve 134 to the running position, a port therein establishes communication between the independent application pipe 99 and the passage 158 leading to a port in the seat of the rotary valve 117 of the automatic portion 2 of the engineer's brake valve, while at this time the port 159 in the rotary valve 117 establishes communication between the passage 158 and an atmospheric passage 160 so that the independent application pipe 90 is connected to the atmosphere.

*Operation on brake application by the independent brake valve in its slow application position*

The independent portion 3 of the engineer's brake valve is provided with a slow application position in which the application of the brakes on the locomotive is effected at a slow rate. When the handle 130 of the independent portion 3 is turned to the slow application position, the rotary valve 124 is turned to a position in which communication is established between the independent release pipe 64 and the atmosphere, and in which a port in the rotary valve 124 permits the supply of fluid under pressure from the chamber 122 to a passage 173 having a choke 174 interposed therein. The passage 173 communicates with the independent application passage and pipe 90, while in this position of the rotary valve 124 direct communication between the independent application passage and pipe 90 and the valve chamber 122 is cut off. On the supply of fluid under pressure from the chamber 122 to the passage 173 fluid flows at a restricted rate through the choke 174 and thence to the independent application pipe 90.

On the supply of fluid under pressure to the independent application pipe 90, fluid flows therefrom by way of the release valve device 13 to the passage 92, and thence to the delay valve 15. If the delay valve 15 is in the delay position, fluid under pressure supplied by way of the passage 92 flows through the choke 103 to the passage 42 and thence to the application portion 11, while fluid supplied to the passage 42 flows through the cavity 166 in the slide valve 97 to the passage 167 and to the chamber 169.

Since in the delay position of the delay valve 15, fluid under pressure supplied to the passage 42 flows to the application chamber 169, as well as to the chamber 41 of the application portion 11, the rate of increase in the pressure of the fluid in the chamber 41 will not be as rapid as when the piston of the delay valve 15 is in the non-delay position, at which time communication between the passage 42 and the application chamber 169 is cut off.

However, the slow application position of the independent portion of the engineer's brake valve is intended to be employed only when a slow application of the brakes on the locomotive is desired, and the delay in the application of the brakes on the locomotive produced by the delay valve 15 is not objectionable, and may be advantageous, particularly since a rapid application of the brakes on the locomotive may be secured at any time by movement of the handle of the independent portion of the engineer's brake valve to the fast application position.

Accordingly, the cam 146 associated with the shaft 127 of the independent portion 3 of the engineer's brake valve is arranged so that on movement of the handle 130 to the slow application position, the cam will not engage the end of the stem 138 of the valve 134 to cause this valve to be moved to the open position to release fluid under pressure from the chamber 132, and thus from the chamber 98 in the delay valve 15. Accordingly, the piston 95 of the delay valve 15 will remain in the delay position, if the control valve device 144 is conditioned to supply fluid under pressure to the pipe 99 leading to the chamber 98 of the delay valve.

On a subsequent movement of the handle 130 of the independent portion 3 to the release position, and thereafter to a running position, fluid under pressure is released from the independent application pipe 90, and thereby from the application portion 11, substantially as described in detail above.

*Operation on a fast application when the delay valve is in the non-delay position*

When the handle 147 of the control valve device 144 is turned in a clockwise direction one quarter of a turn from the position in which it is shown in Fig. 1 of the drawings, the valve 146 is turned to a position in which communication between the passage 148 and port 150 is cut off, while the port 150 is connected to the atmospheric passage 151 with the result that the supply of fluid under pressure to the pipe and passage 99 is cut off, while fluid under pressure is released therefrom. As a result of the release of fluid under pressure from the passage and pipe 99, there is a reduction in the pressure of the fluid in the chamber 98, and the piston 95 is moved against the spring 100 by the higher pressure of the fluid in the chamber 96, with the result that the slide valve 97 is moved to the non-delay position in which the cavity 165 therein establishes communication between the passage 92 and the passage 42, by-passing the choke 103, and in which the cavity 166 in the slide valve 97 no longer establishes communication between the passage 42 and the passage 167 leading to the application chamber 169.

When the slide valve 97 of the delay valve 15 is in the non-delay position, fluid under pressure may be supplied by the equalizing portion 10 of the distributing valve 1 to the application portion 11 at a rapid rate on movement of the piston of the equalizing portion to the application position. Similarly, on operation of the independent portion of the engineer's brake valve to supply fluid under pressure to the independent application pipe 90, fluid under pressure may flow at a rapid rate to the application portion 11.

On movement of the handle 130 of the independent portion 3 to the fast application position, the cam 140 will move the valve 134 away from its seat to open communication between the chamber 132 and the atmosphere. As no fluid under pressure is present in the chamber 132 at this time, the opening of the valve 134 is without effect, since the piston of the delay valve 15 is already in the non-delay position.

It will be seen that the brake equipment provided by this invention provides means to permit a rapid application of the brakes on a locomotive, even though the delay valve associated with the brake equipment is conditioned to retard the rate of application of the locomotive brakes.

It will be seen also that the brake equipment provided by this invention incorporates means automatically operable on movement of the independent portion of the engineer's brake valve to the fast application position, to effect movement of the piston of the delay valve to the non-delay position, if it is not already in this position, and permit a rapid application of the brakes on the locomotive. It will be seen further that upon movement of the independent portion of the engineer's brake valve from the fast application position to the release position, the piston of the delay valve is again returned to the delay position, if it occupied this position before the independent portion was moved to the fast application position.

While one embodiment of the improved fluid pressure brake equipment for a locomotive has been illustrated and described in detail, it is to be understood that the invention is not limited to these details of construction, and that numerous changes and modifications may be made without departing from the scope of the following claims.

Having now described my invention, what I claim as new and desire to secure by Letters Patent is:

1. In a vehicle fluid pressure brake equipment, in combination, application means operative on an increase in fluid pressure in an application chamber for effecting an application of the brakes, valve means for supplying fluid to said application chamber, a delay valve controlling the rate of increase in fluid pressure in said chamber on the supply of fluid thereto by said valve means, manual means for controlling said delay valve, and means associated with said valve means for also controlling said delay valve irrespective of operation of said manual means.

2. In a vehicle fluid pressure brake equipment, in combination, application means operative on an increase in fluid pressure in an application chamber for effecting an application of the brakes, valve means for supplying fluid to said application chamber, a delay valve subject to the pressure of the fluid in an operating chamber for controlling the rate of increase in fluid pressure in said application chamber on the supply of fluid thereto by said valve means, a valve device for controlling the pressure of the fluid in said operating chamber, and means associated with said valve means for also controlling pressure of the fluid in said operating chamber irrespective of operation of said valve device.

3. In a vehicle fluid pressure brake equipment, in combination, application means operative on an increase in fluid pressure in a chamber to effect an application of the brakes, valve means for supplying fluid to a communication through which fluid may be supplied to said chamber, said valve means having a slow application position in which fluid is supplied to said communication at one rate and having a fast application position in which fluid is supplied to said communication at a more rapid rate, a valve device controlling the rate of increase in the pressure of the fluid in said chamber on the supply of fluid thereto through said communication, and means operable only on movement on said valve means to the fast application position to control said valve device.

4. In a vehicle fluid pressure brake equipment, in combination, application means operative on an increase in fluid pressure in an application chamber to effect an application of the brakes, valve means for supplying fluid to a communication through which fluid may be supplied to said application chamber, said valve means having a slow application position in which fluid is supplied to said communication at one rate and having a fast application position in which fluid is supplied to said communication at a more rapid rate, a delay valve responsive to the pressure of the fluid in an operating chamber for controlling the rate of increase in the pressure of the fluid in said application chamber on the supply of fluid thereto through said communication, and means operable only on movement of said valve means to the fast application position for varying the pressure of the fluid in said operating chamber.

5. In a vehicle fluid pressure brake equipment, in combination, application means operative on an increase in fluid pressure in a chamber to effect an application of the brakes, valve means for supplying fluid to a communication through which fluid may be supplied to said chamber, said valve means having a plurality of application positions and including a position in which it supplies fluid to said communication at one rate and a position in which it supplies fluid to said communication at a different rate, a valve device controlling the rate of increase in the pressure of the fluid in said chamber on the supply of fluid thereto through said communication, and means operable only on movement of said valve means to a predetermined one of its application positions to control said valve device.

6. In a vehicle fluid pressure brake equipment, in combination, application means operative on an increase in fluid pressure in an application chamber to effect an application of the brakes, valve means for supplying fluid to a communication through which fluid may be supplied to said application chamber, said valve means having a plurality of application positions and including a position in which it supplies fluid to said communication at one rate and a position in which it supplies fluid to said communication at one rate and a position in which it supplies fluid to said communication at a different rate, a delay valve responsive to the pressure of the fluid in an operating chamber for controlling the rate of increase in the pressure of the fluid in said application chamber on the supply of fluid thereto through said communication, and means operable only on movement of said valve means to a predetermined one of its application positions for varying the pressure of the fluid in said operating chamber.

7. In a fluid pressure brake equipment, in combination, application means operative on an increase in fluid pressure to effect an application of the brakes, a delay valve subject to the pressure of the fluid in a chamber for controlling the rate of flow of fluid through a communication through which fluid may be supplied to said application means, a valve device for controlling the pressure of the fluid in said chamber, and valve means for supplying fluid under pressure to said communication and for also controlling the pressure of the fluid in said chamber.

8. In a fluid pressure brake equipment, in combination, application means operative on an increase in fluid pressure to effect an application of the brakes, valve means for supplying fluid to a communication through which fluid may be supplied to said application means, a delay valve subject to the pressure of the fluid in a chamber and controlling the rate of flow of fluid through said communication, and a control valve device for controlling the pressure of the fluid in said chamber, the pressure of the fluid in said chamber being also controlled by said valve means.

9. In a fluid pressure brake equipment, in combination, application means operative on an increase in fluid pressure to effect an application of the brakes, a delay valve subject to and operated on an increase in the pressure of the fluid in a chamber to restrict the rate of flow of fluid through a communication through which fluid may be supplied to said application means, a valve device operative to release fluid from said chamber or to supply fluid thereto at a predetermined rate, and valve means for supplying fluid to said communication and for also controlling a communication through which fluid may be released from said chamber at a rate more rapid than predetermined rate.

10. In a fluid pressure brake equipment, in combination, application means operative on an increase in fluid pressure to effect an application of the brakes, a delay valve subject to the pressure of the fluid in a chamber for controlling the rate of flow of fluid through a communication through which fluid may be supplied to said application means, a valve device for controlling the pressure of the fluid in said chamber, valve means having a slow application position in which it supplies fluid to said communication at one rate and having a fast application position in which it supplies fluid to said communication at a more rapid rate, and means operable only on movement of said valve means to the fast application position to control the pressure of the fluid in said chamber.

11. In a fluid pressure brake equipment, in combination, application means operative on an increase in fluid pressure to effect an application of the brakes, a delay valve subject to the pressure of the fluid in a chamber for controlling the rate of flow of fluid through a communication through which fluid may be supplied to said application means, a valve device for releasing fluid from or for supplying fluid to said chamber, valve means having a slow application position in which it supplies fluid to said communication at one rate and having a fast application position in which it supplies fluid to said communication at a more rapid rate, and means operable only on movement of said valve means to the fast application to open a communication through which fluid may be released from said chamber at a rate more rapid than said predetermined rate.

12. In a fluid pressure brake equipment for a locomotive, in combination, application means operative on an increase in fluid pressure in an application chamber for effecting the application of the brakes on the locomotive, an independent brake valve for supplying fluid under pressure to said application chamber, a delay valve device operable by variations in fluid pressure for controlling the rate at which the pressure of the fluid in the application chamber is increased by fluid supplied by said independent brake valve, said delay valve being operable in one position to permit the pressure of the fluid in the application chamber to be increased at one rate and being operable in another position to permit the pressure of the fluid in the application chamber to be increased at a more rapid rate, said independent brake valve being operable to effect a variation in fluid pressure on said delay valve device to effect movement thereof to the position to permit the fluid in the application chamber to be increased at the rapid rate.

13. In a fluid pressure brake equipment for a locomotive, in combination, application means operative on an increase in fluid pressure in an application chamber for effecting the application of the brakes on the locomotive, an independent brake valve for supplying fluid under pressure to said application chamber, a delay valve device operable by variations in fluid pressure for controlling the rate at which the pressure of the fluid in the application chamber is increased by fluid supplied by said independent brake valve, said delay valve being operable in one position to permit the pressure of the fluid in the application chamber to be increased at one rate and being operable in another position to permit the pressure of the fluid in the application chamber to be increased at a more rapid rate, and means operable by said independent brake valve to effect a variation in fluid pressure on said delay valve device to effect movement thereof to the position to permit the fluid in the application chamber to be increased at the rapid rate.

14. In a fluid pressure brake equipment for a locomotive, a brake cylinder, application means operative on an increase in fluid pressure to supply fluid under pressure to the brake cylinder, an independent brake valve for supplying fluid under pressure to a communication through which fluid under pressure may be supplied to said application means, said communication having a restriction therein, the independent brake valve having a slow application position in which it supplies fluid to said communication at a slow rate and having a fast application position in which it supplies fluid to said communication at a rapid rate, a delay valve subject to and operated on a reduction in the pressure of the fluid in an operating chamber to establish a by-pass passage extending around the restriction in said communication, a control valve for supplying fluid to said operating chamber, and means operable in the fast application position of said independent brake valve for releasing fluid under pressure from said operating chamber.

15. In a vehicle fluid pressure brake equipment, in combination, application means operative upon an increase in fluid pressure in an application chamber for effecting an application of the brakes, valve means movable to an application position for supplying fluid to said application chamber, a delay valve device for controlling the rate at which fluid is supplied to said application chamber by said valve means, said delay valve device having a slow application position in which fluid under pressure is supplied to the application chamber at one rate and a fast application position in which fluid under pressure is supplied to the application chamber at a more rapid rate, a control device for effecting the operation of said delay valve device, said control device being movable to a delay position in which it effects movement of the delay valve device to its slow application position, and means operative by said valve means on movement thereof to its application position to effect the movement of the delay valve device to the fast application position regardless of the position of the control device.

16. In a vehicle fluid pressure brake equipment, in combination, application means operative on an increase in fluid pressure in an application chamber for effecting an application of the brakes, valve means movable to either of a plurality of application positions for supplying fluid under pressure to said application chamber at either one of a plurality of different rates, a delay valve device for controlling the rate at which fluid is supplied to said application chamber by said valve means, said delay valve device having a slow application position in which fluid is supplied to the application chamber at one rate and a fast application position in which the pressure of the fluid in the application chamber may be increased at a more rapid rate, a control device for effecting operation of the delay valve device, said control device being movable to a delay position in which it effects movement of the delay valve device to its slow application position, and means operative by said valve means on movement thereof to at least one of its application positions to condition the delay valve device to occupy the fast application position regardless of the position of the control device.

17. In a vehicle fluid pressure brake equipment, in combination, application means operative on an increase in fluid pressure in an application chamber for effecting an application of the brakes, valve means for supplying fluid to said application chamber, said valve means being movable to either one of a plurality of application positions to supply fluid to the application chamber at either one of a plurality of different rates, a delay valve device responsive to the pressure of the fluid in an operating chamber for controlling the rate at which fluid is supplied to said application chamber by said valve means, said delay valve device being operative in response to one pressure condition in said operating chamber to occupy a fast application position in which fluid is supplied to the application chamber at one rate, and being operative in response to another pressure condition in said operating chamber to occupy a delay position in which fluid may only be supplied to said application chamber at a less rapid rate, a control valve for varying the pressure of the fluid in said operating chamber, and means operative by said valve means on movement thereof to at least one of its application positions for producing said one pressure condition in said operating chamber regardless of operation of the control valve.

18. In a vehicle fluid pressure brake equipment, in combination, application means operative on an increase in fluid pressure in an application chamber for effecting an application of the brakes, valve means for supplying fluid to said application chamber, said valve means being movable to either one of a plurality of application positions to supply fluid to the application chamber at either one of a plurality of different rates, a delay valve device responsive to the pressure of the fluid in an operating chamber for controlling the rate at which fluid is supplied to said application chamber by said valve means, said delay valve device being operative in response to a predetermined reduction in the pressure of the fluid in said operating chamber to occupy a fast application position in which fluid is supplied to the application chamber at one rate and being operative in response to a predetermined increase in the pressure of the fluid in said operating chamber to occupy a slow application position in which fluid may only be supplied to said application chamber at a less rapid rate, a control valve for supplying and releasing fluid under pressure to and from said operating chamber, and means operative by said valve means on movement thereof to at least one of its application positions for effecting said predetermined reduction in the pressure of the fluid in said operating chamber regardless of the supply of fluid to said operating chamber by said control valve.

19. In a vehicle fluid pressure brake equipment, in combination, application means operative on an increase in fluid pressure in an application chamber for effecting an application of the brakes, valve means for supplying fluid to said application chamber, said valve means being movable to either one of a plurality of application positions to supply fluid to the application chamber at either one of a plurality of different rates, a delay valve device responsive to the pressure of the fluid in an operating chamber for controlling the rate at which fluid is supplied to said application chamber by said valve means, said delay valve device being operative in response to a predetermined reduction in the pressure of the fluid in said operating chamber to occupy a fast application position in which fluid is supplied to the application chamber at one rate and being operative in response to a predetermined increase in the pressure of the fluid in said operating chamber to occupy a slow application position in which fluid may only be supplied to said application chamber at a less rapid rate, a control valve for supplying fluid under pressure to said operating chamber at a predetermined rate and for also releasing fluid under pressure from said operating chamber, and means operative by said valve means on movement thereof to at least one of its application positions for releasing fluid from said operating chamber at a rate more rapid than said predetermined rate to thereby cause the delay valve device to occupy its fast application position regardless of the supply of fluid to the operating chamber by said control valve.

ELLIS E. HEWITT.